US010449646B2

(12) United States Patent
Gramlich et al.

(10) Patent No.: US 10,449,646 B2
(45) Date of Patent: Oct. 22, 2019

(54) PRESSING DEVICE FOR A MACHINE TOOL FOR MACHINING WORKPIECES OF WOOD, PLASTICS AND THE LIKE AS WELL AS A MACHINE TOOL WITH AT LEAST ONE PRESSING DEVICE

(71) Applicant: Michael Weinig AG, Tauberbischofsheim (DE)

(72) Inventors: Rainer Gramlich, Ravenstein-Oberwittstadt (DE); Walter Rapp, Königheim-Gissigheim (DE); Ralf Wagner, Hardheim (DE)

(73) Assignee: Michael Weinig AG, Tauberbischofsheim (DE)

( * ) Notice: Subject to any disclaimer, the term of this patent is extended or adjusted under 35 U.S.C. 154(b) by 269 days.

(21) Appl. No.: 15/367,584

(22) Filed: Dec. 2, 2016

(65) Prior Publication Data
US 2017/0157726 A1 Jun. 8, 2017

(30) Foreign Application Priority Data
Dec. 4, 2015 (DE) .......................... 10 2015 016 221

(51) Int. Cl.
| | |
|---|---|
| *B23Q 3/00* | (2006.01) |
| *B27C 1/08* | (2006.01) |
| *B27C 5/06* | (2006.01) |
| *B27G 19/10* | (2006.01) |
| *F16B 2/14* | (2006.01) |
| *B27C 1/00* | (2006.01) |
| *B27C 1/12* | (2006.01) |
| *F16B 5/02* | (2006.01) |
| *F16B 31/04* | (2006.01) |
| *F16B 43/02* | (2006.01) |

(52) U.S. Cl.
CPC .............. *B23Q 3/002* (2013.01); *B27C 1/007* (2013.01); *B27C 1/08* (2013.01); *B27C 1/12* (2013.01); *B27C 5/06* (2013.01); *B27G 19/10* (2013.01); *F16B 2/14* (2013.01); *F16B 5/02* (2013.01); *F16B 31/043* (2013.01); *F16B 43/02* (2013.01)

(58) Field of Classification Search
CPC ..... B27G 19/10; B23P 11/00; B30B 15/0029; B30B 15/0035; B30B 15/0047; B27C 5/02; B27C 5/04; B27C 5/06
USPC .................................... 100/219, 257; 29/235
See application file for complete search history.

(56) References Cited

U.S. PATENT DOCUMENTS
| | | |
|---|---|---|
| 5,452,752 A | 9/1995 | Aigner |
| 5,477,899 A | 12/1995 | Schmitt |
| 6,029,722 A | 2/2000 | Englert |
| 6,478,060 B1 | 11/2002 | Liao |

(Continued)

*Primary Examiner* — Matthew Katcoff
(74) *Attorney, Agent, or Firm* — Gudrun E. Huckett (57) ABSTRACT

A pressing device for a machine tool for processing or machining workpieces made of wood or plastics is provided with at least one support with a counter wedge surface. At least one pressing element is fastened to the at least one support. At least one wedge clamping device is provided that has at least one wedge pressure member with a first wedge surface that is resting on the counter wedge surface of the at least one support. The at least one wedge clamping device also has at least one adjusting element acting on the at least one wedge pressure member. The at least one wedge clamping device clamps the at least one pressing element on the at least one support. A machine tool with such a pressing device is provided.

23 Claims, 4 Drawing Sheets

(56) References Cited

U.S. PATENT DOCUMENTS

| | | | |
|---|---|---|---|
| 6,976,514 B2* | 12/2005 | Wagner | B23Q 3/002 100/35 |
| 2001/0017169 A1 | 8/2001 | Englert | |
| 2009/0151818 A1 | 6/2009 | Balolia | |
| 2011/0214551 A1* | 9/2011 | Chuang | B26D 1/12 83/663 |
| 2012/0082528 A1 | 4/2012 | Wang | |

* cited by examiner

PRESSING DEVICE FOR A MACHINE TOOL FOR MACHINING WORKPIECES OF WOOD, PLASTICS AND THE LIKE AS WELL AS A MACHINE TOOL WITH AT LEAST ONE PRESSING DEVICE

BACKGROUND OF THE INVENTION

The invention concerns a pressing device for a machine tool for machining workpieces of wood, plastics and the like; with at least one pressing element that is fastened to at least one support, as well as a machine tool, in particular a moulding machine, with at least one pressing device.

Pressing devices are employed in machine tools, in particular in moulding machines, in order to load the workpieces against the transport path during machining by appropriate tools of the machine so that an exact machining of the workpieces is possible. In a moulding machine, the pressing device is arranged in the area of a horizontal top spindle that is located at a spacing above the transport path for the workpieces and on which a tool is seated with which the top side of the workpiece is machined as it passes through the moulding machine. The pressing element must be adjusted to the diameter of the cutting circle of the respectively employed tool. For this purpose, it is required that the pressing element together with the top spindle is moved into an upper position so that a fastening screw at the bottom side of the pressing element can be loosened in order to be able to adjust the pressing element relative to its support. This is possible only in catch steps because the pressing element and the support are provided with a corresponding toothing provided for form fit so that the pressing element cannot be pushed into the tool in operation of the machine tool. Since the fastening screw is not easily accessible and the spacing to the tool cutting circle can be adjusted only in the predetermined catch steps, an optimal adjustment of the pressing element is not possible.

The invention has the object to design the pressing device of the aforementioned kind and the machine tool of the aforementioned kind such that the pressing element can be adjusted in a simple way very precisely to the desired position.

SUMMARY OF THE INVENTION

This object is solved for the pressing device of the aforementioned kind and the machine tool of the aforementioned kind in accordance with the invention in that the pressing element can be clamped on the support by at least one wedge clamping device that comprises at least one adjusting element that engages at least one wedge pressure member that is resting with at least one wedge surface on a counter wedge surface of the support.

In the pressing device according to the invention, the pressing element can be adjusted very simply and precisely to the required position. The pressing element can be clamped by means of the wedge clamping device on the support. The wedge clamping device enables a simple and continuous adjustment of the pressing element that, in this way, can be adjusted very precisely to the cutting circle diameter of the respective tool. The adjusting element which engages the wedge pressure member can be provided such that it can be actuated in a simple way by the operator of the pressing device. Advantageously, the adjusting element is provided such that it can be actuated from the input side of the workpieces. The use of the wedge clamping device makes it possible also to exchange the pressing element in a simple way.

In an advantageous embodiment, the wedge pressure member is penetrated by a stud bolt with radial clearance.

Preferably, the wedge pressure member has a through opening whose diameter is greater than the outer diameter of the stud bolt or which is designed as a slotted hole. In this way, it is ensured that the wedge pressure member can be clamped reliably without the position of the stud bolt and thus of the pressing element being affected during the clamping process. As a result of radial clearance between the stud bolt and the wall of the through opening, the wedge pressure member can be moved relative to the stud bolt without a contact between the wall of the through opening and the stud bolt having to be feared.

In a constructively simple configuration, the wedge pressure member is supported on the opposite wedge surface of the support, wherein it advantageously loads in turn a fastening element. The fastening element is provided on the stud bolt and advantageously is a nut that is screwed onto the free end of the stud bolt.

So that a safe clamping action of the pressing element is achieved, the wedge pressure member comprises two wedge surfaces which are positioned at an acute angle relative to each other. One wedge surface is positioned flat against the counter wedge surface of the support. The other wedge surface acts on the fastening element.

In a preferred embodiment, the adjusting element engages an end face contact surface of the wedge pressure member. This contact surface extends angularly relative to the wedge surface of the wedge pressure member.

Advantageously, the adjusting element is an adjusting spindle which is screwed into a threaded bore of the support. With the adjusting spindle, the wedge pressure member can be reliably clamped.

A compact configuration which requires only little installation space results when the counter wedge surface is the bottom of a recess of the support. In this case, the wedge clamping device can be substantially completely housed within the recess.

A reliable clamping action of the pressing element by means of the wedge clamping device results when the stud bolt is connected fixedly with a sliding block which is positioned in a groove of the pressing element. The sliding block is positioned with form fit in the groove. When the pressing element is adjusted in the direction toward the cutting circle diameter of the tool, the pressing element is moved relative to the sliding block as well as to the stud bolt.

The groove of the pressing element is advantageously a T groove. In this way, a reliable form fit connection between the sliding block and thus the stud bolt as well as the pressing element is ensured. It can be moved continuously along the sliding block. As soon as the pressing element has the desired spacing relative to the cutting circle diameter of the tool, it can be clamped on the support by means of the wedge clamping device.

In a further embodiment according to the invention, the pressing element can be adjusted continuously relative to the support by means of at least one adjusting spindle. The pressing element can be adjusted therefore very precisely to the cutting circle diameter of the tool.

The pressing device can be adjusted in an advantageous way in vertical direction (y axis).

In order to be able to secure the pressing device in the respective y position, the pressing device is advantageously clampable by means of at least one clamping lever in the respective y position.

In an advantageous embodiment, the clamping lever in the clamping position clamps by means of at least one axial thrust bearing the pressing device against a suction hood. In this way, a great clamping force in relation to the actuating force of the clamping lever results.

The axial thrust bearing surrounds in an advantageous embodiment a stud bolt whose one end is attached to the suction hood and which has a clamping lever screwed onto the other end.

In a preferred embodiment, the support is provided with at least one pressing base that is connected pivotably with a pressing case. The joint connection enables that the pressing base together with the support and the pressing element can be moved into a start position.

In a constructive inexpensive and simple configuration, the joint connection between the pressing base and the pressing case has two joint members that are positioned at a spacing above each other and that are connected pivotably with the pressing base and the pressing case. The joint axes of the two joint members are positioned parallel to each other, respectively. The two joint members provide for a problem-free adjustment of the pressing base in that the pressing element can be pivoted away from the tool when the pressing element is lifted by oversize of the workpiece.

Preferably, the pressing device is designed such that the pressing element under weight force is positioned in a stop-limited start position. In this way, it is achieved that the pressing element in a simple way returns automatically into the start position when it comes clear from the workpiece. Complex and expensive adjusting devices are therefore not required.

The stop limitation of the pressing element in the start position can be achieved in that a joint member of the joint connection between the pressing base and the pressing case is provided with at least one stop which, in the start position, is contacting a counter stop of the pressing case. In the start position, the pressing element has the smallest spacing relative to the transport path of the workpiece. This spacing is adjusted such that even the thinnest workpiece to be machined will run against the pressing element and lift it out of its start position. In this way, the pressing element automatically is moved into the pressing position in which it is resting against the workpiece to be machined.

In an advantageous embodiment, the pressing base is provided at its end which is facing away from the pressing element with at least one plunger that is interacting with a piston rod of a pressing cylinder. With this pressing cylinder, an additional pressing force can be exerted in order to load the pressing element in addition to its weight force. The workpiece to be machined is therefore pressed reliably against the transport path in the area of the tool.

A constructively simple configuration results when the piston rod is resting loosely on the plunger. This has the advantage that the pressing base with the plunger can move away from the piston rod as soon as the workpiece has been transported away underneath the pressing element. Then, the pressing element can move downward into the start position while the plunger moves away from the piston rod of the pressing cylinder.

In an advantageous way, by means of the plunger also a stop limitation for the pressing element can be achieved in that the stroke of the plunger is adjusted. In the start position of the pressing element, the plunger is resting by means of at least one stop with intermediate positioning of at least one damping element against the pressing case and forms in this way the stop for the pressing element in its start position. Due to the effect of the damping disk, after the workpiece has left the pressing element, a hard impact of the pressing element upon dropping back into its start position is prevented. In this way, it is avoided that this impact causes vibration excitation of machine parts or of the workpiece which could have negative effects on the machining quality.

The machine tool according to the invention which is advantageously a moulding machine is furnished with at least one pressing device according to the invention. Such a machine tool provides for a high quality machining of the workpieces wherein the pressing device is of a constructively simple and inexpensive design and, despite of this, provides for proper support and guiding action of the workpieces to be machined. The adjustment of the pressing element is realized very simply, quickly, and precisely.

In the transport direction of the workpiece, the pressing element is arranged upstream of the horizontal spindle which is located at a spacing above the transport path of the machine tool for the workpieces.

In an advantageous embodiment, the pressing element is positioned in the start position in the transport path of the workpieces through the machine tool. In this context, the pressing element in the start position is in such a position that it is lifted by the workpiece which is passing through the machine tool so that the pressing element subsequently is resting on the top face of the workpiece at least under its weight force.

The subject matter of the application not only results from the subject matter of the individual claims but also from all specifications and features disclosed in the drawings and the description. They are claimed as important to the invention, even if they are not subject matter of the claims, inasmuch as they are novel, individually or in combination, relative to the prior art.

Further features of the invention result from the further claims, the description, and the drawings.

BRIEF DESCRIPTION OF THE DRAWINGS

The invention will be explained in more detail with the aid of an embodiment illustrated in the drawings. It is shown in.

DESCRIPTION OF PREFERRED EMBODIMENTS

The pressing device is part of a moulding machine with which workpieces can be machined at their faces in a continuous process. In general, the workpieces, which are preferably made of wood, have rectangular cross-section. As these workpieces pass through the moulding machine, the four outer faces of the workpiece are machined by appropriate tools. Sequentially arranged in the direction of passage, the moulding machine has a bottom spindle, a right spindle, a left spindle as well as a top spindle. The spindles are positioned in the direction of passage at a spacing behind each other, respectively, and support the corresponding machining tools. During passage through the moulding machine, the workpieces are guided along one longitudinal face, preferably the right longitudinal face, on a stop edge. It is interrupted in the working area of the tool seated on the right spindle so that with this tool the right longitudinal face of the workpiece is machined during passage.

The right and the left spindles are vertical spindles while the top and the bottom spindles are horizontal spindles. Depending on the configuration of the moulding machine, further spindles can be provided, for example, two top spindles and/or two right and/or two left spindles.

The pressing device is provided in the area of a top horizontal spindle 1 on which is seated fixedly a tool 2 with which the top face of the workpiece 3 passing through the moulding machine is machined. The tool 2 can be a planing tool with which the top face of the workpiece 3 is planed smooth. The top spindle 1 together with the pressing device is adjustable in vertical direction for adaptation to the desired machining height.

So that a clean and high-quality surface machining of the workpiece 3 by the tool 2 can take place, the workpiece 3, in the direction of passage before and behind the tool 2, is forced by a pressing device 80, 81 with at least one pressing element 4, 5, respectively, against the transport path 6 of the moulding machine on which the workpieces 3 are supported as they pass through the moulding machine. Accordingly, the workpieces 3 are guided and held in a clean, precise, calm and vibration free way as they pass through. The transport of the workpieces 3 is realized by feeding or transport rollers, not illustrated, that engage the top face of the workpieces 3 and convey them through the machine for machining.

The pressing elements 4, 5 must be adjusted relative to the cutting circle diameter as well as the moulding depth of the tool 2.

Figure 1:
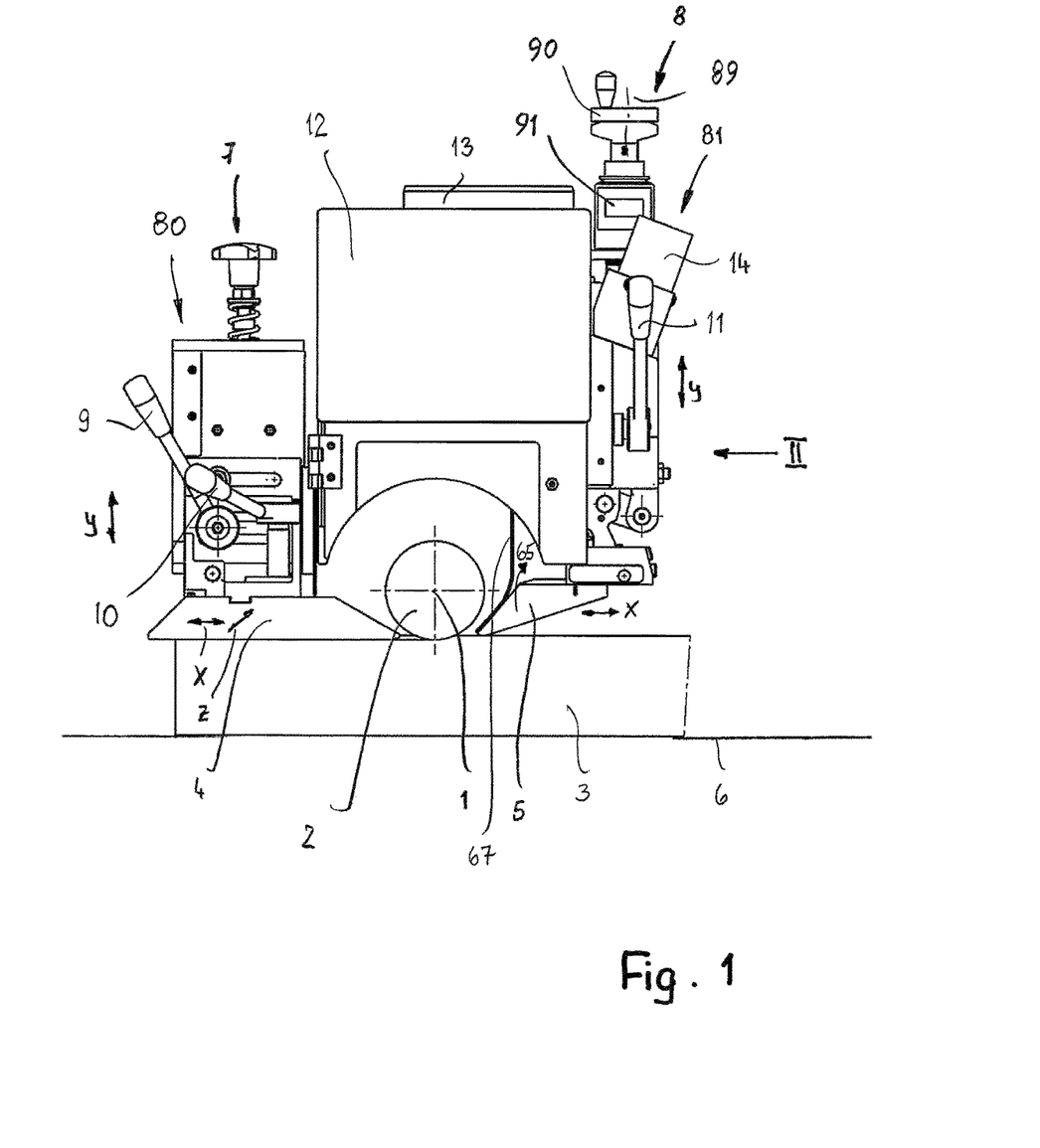
FIG. 1 a view of the pressing device according to the invention.

As is illustrated in FIG. 1, the pressing element 5 in the direction of passage upstream of the tool 2 has a greater spacing from the transport path 6 than the pressing element 4 which is located in the direction of passage downstream of the tool 2 because the tool 2 has removed material from the top face of the workpiece 3.

The pressing element 4 which is arranged in the direction of passage downstream of the tool 2 is adjustable in x direction (corresponds to transport direction) as well as perpendicular thereto in z direction. The z direction is positioned parallel to the axis of the spindle 1.

The pressing element 5 which is arranged in the transport direction upstream of the tool 2 can also be adjusted in the x direction, i.e., in transport direction of the workpiece 3. Also, the pressing element 5 can be pivoted in a way to be described in the following upwardly away from the tool 2 which is indicated in FIG. 1 by an arrow 65 (see also FIG. 3). This pivoting possibility of the pressing element makes it possible to compensate oversize of wood blanks.

The two pressing elements 4, 5 can be adjusted as component of the pressing devices 80, 81 by means of a respective adjusting device 7, 8 in the vertical direction (y direction) in order to be able to adjust the pressing elements 4, 5 to different cutting circle diameters of the tool 2.

The pressing device 80 has two clamping levers 9, 10. With the clamping lever 9, clamping of the pressing element 4 against displacement in x direction is realized and with the clamping lever 10 against displacement in z direction. The pressing device 81 has a clamping lever 11 with which the pressing element 5 is secured against displacement in y direction.

The spindle 1 with the tool 2 is located below a suction hood 12 by means of which chips and the like, produced during machining of the workpiece 3 with the tool 2, are removed. The suction hood 12 is provided on the topside with a suction socket 13 to which a suction conduit is connected.

The entire suction hood 12 is arranged on a support (not illustrated) for the top spindle 1, the so-called spindle slide, and is moved in y direction together with the top spindle 1 for adjustment to different workpiece thicknesses. The two pressing devices 80, 81 are provided on opposite sides of the suction hood 12 and are fastened either directly on the suction hood 12 or on the spindle slide and are entrained also by this height adjustment of the top spindle 1. By means of the adjusting devices 7, 8, the pressing elements 4, 5 can be adjusted relative to the suction hood 12 and the tool 2 in y direction.

Figure 2:
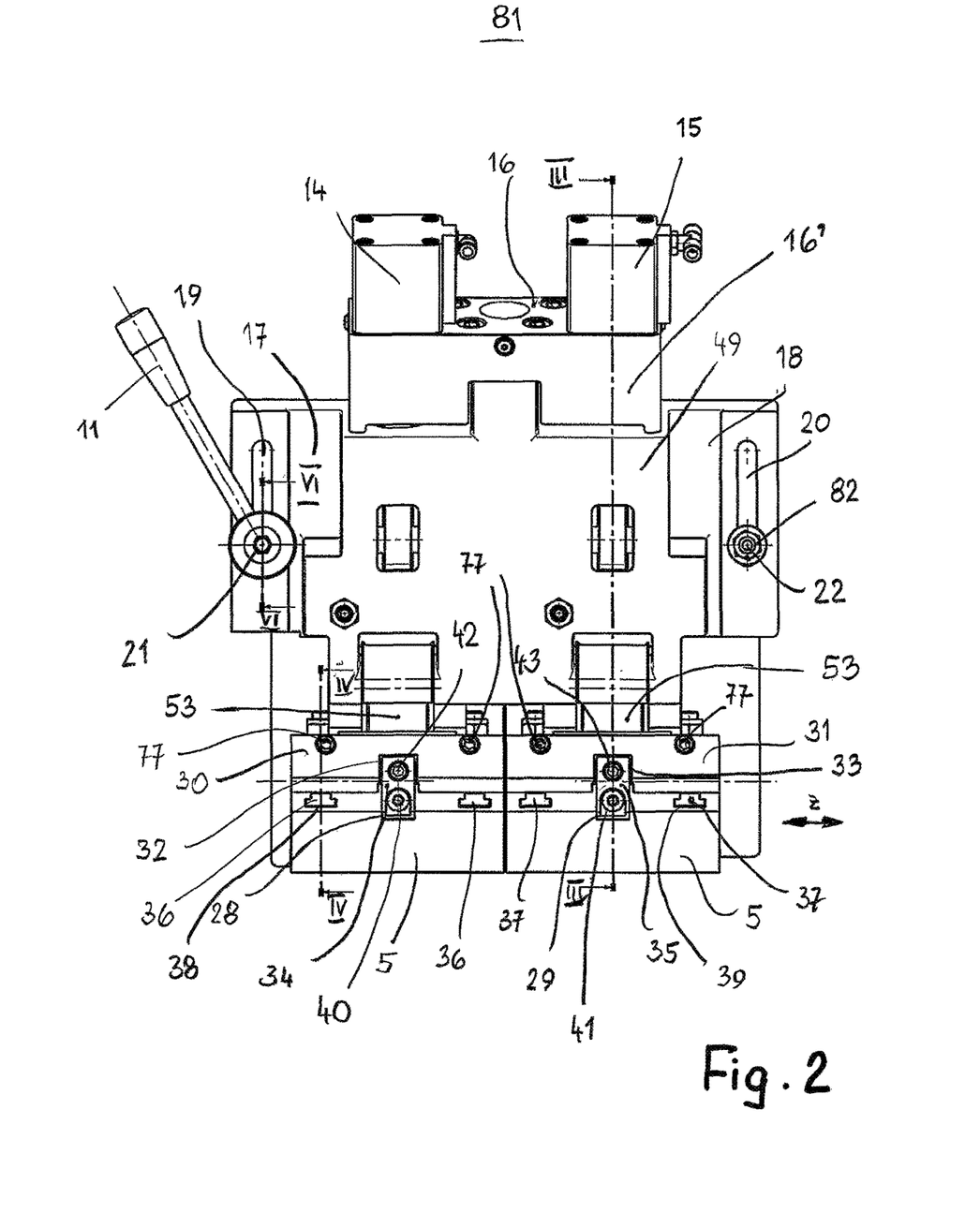
FIG. 2 a view of the pressing device in the direction of arrow II of FIG. 1.
Figure 6:
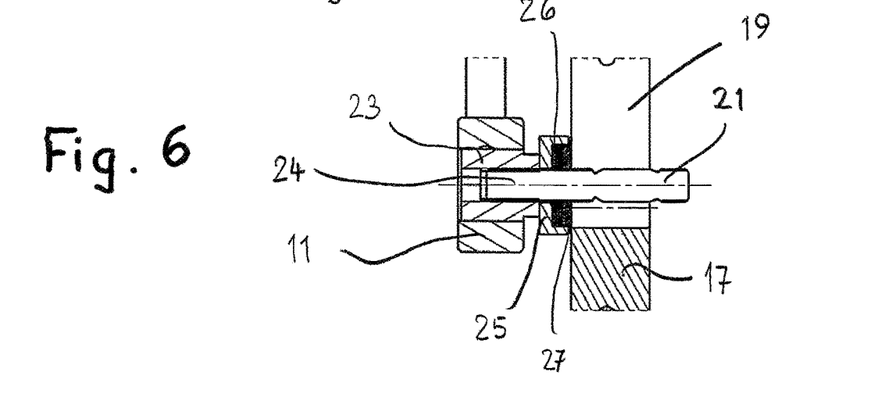
FIG. 6 in enlarged illustration a section along the line VI-VI of FIG. 2.

FIG. 2 shows that, across the working width of the pressing device 81 upstream of the top spindle, two pressing elements 5 are provided which extend transversely to the transport direction of the workpieces and approximately adjoin each other. For producing a pressing force, two pressing cylinders 14, 15 are provided which are provided on the top side of a support 16 of the pressing device 81. The support 16 is arranged in the form of a plate on a pressing case 49 that comprises two flanges 17, 18 extending in vertical direction and provided each with a slot 19, 20 extending in y direction. The length of the slots 19, 20 determines the maximum adjusting travel of the pressing device 81 in y direction. Through the slots 19, 20 stud bolts 21, 22 are projecting that extend horizontally and are connected to the suction hood 12 (FIGS. 2 and 6). On one stud bolt 21, a clamping lever 11 is seated. On the other stud bolt 22, a self-locking nut 82 is seated without clearance so that the pressing device 81 can still be adjusted up/down. The clamping lever 11 is seated, as shown in FIG. 6, with a threaded sleeve 23 on a threaded section 24 of the stud bolt 21. The threaded sleeve 23 is connected fixedly with the clamping lever 11 and is projecting in the direction of the flange 17 past the clamping lever 11. It is resting with its end face against a disk 25. It surrounds a thrust bearing 26 that preferably is an axial needle bearing that surrounds the stud bolt 21. The thrust bearing is resting against a clamping disk 27 which is also seated on the stud bolt 21 and can be pressed against the flange 17. The disk 25 has axial spacing from flange 17 and radial spacing relative to the clamping disk 27.

When the clamping lever 11 is pivoted, it is axially displaced by the threaded sleeve 23 on the stud bolt 21 in accordance with the thread pitch. In this way, when the clamping action is to be obtained, the disk 25 is pressed in the direction toward the flange 17 by pivoting of the clamping lever 11. By means of the thrust bearing 26, the clamping disk 27 is pressed fixedly against the flange 17 so that it is secured against displacement in y direction. Since the clamping lever 11 is a one-arm lever, has a sufficient lever length, and the friction force due to employment of the thrust bearing 26 is minimal, a sufficiently high clamping force can be exerted on the flange 17 and thus on the entire pressing device 81 so that a reliable clamping action of the flange 17 and thus of the pressing device 81 in the respective y position is ensured.

In principle, it is sufficient when only one clamping lever 11 is provided for clamping of the adjusting device 8 on the suction hood 11 in y direction. However, instead of the nut 82 on the stud bolt 22, a clamping lever can be provided also which is embodied in the same way as the afore described clamping lever 11.

The two pressing elements 5 are positioned by at least one respective guiding element 28, 29 in their installation position in z direction. The guiding elements 28, 29 form keys that are either milled on the pressing elements or screwed thereon and that ensure an exact alignment and adjustment of the two pressing elements 5 relative to a respective receptacle 30, 31 that each form a support for the pressing elements 5. Advantageously, the receptacles 30, 31 are detachably fastened on the respective pressing base 53 (FIG. 3) of the pressing device 81. The guiding elements 28, 29 are plate-shaped and engage corresponding keyways 32, 33 of the receptacles 30, 31.

The pressing elements 5 are formed on the top side with grooves 38, 39 which extend in x direction and which are engaged by at least one respective sliding block 36, 37. The grooves 38, 39 have T-shaped cross section. The sliding blocks 36, 37 have also T-shaped cross section and are positioned with form fit in the grooves 38, 39. Depending on the width of the pressing elements 5, one or several sliding blocks 36, 37 and grooves 38, 39 per pressing element 5 are provided and are positioned at a spacing to each other in Z direction.

Figure 5:
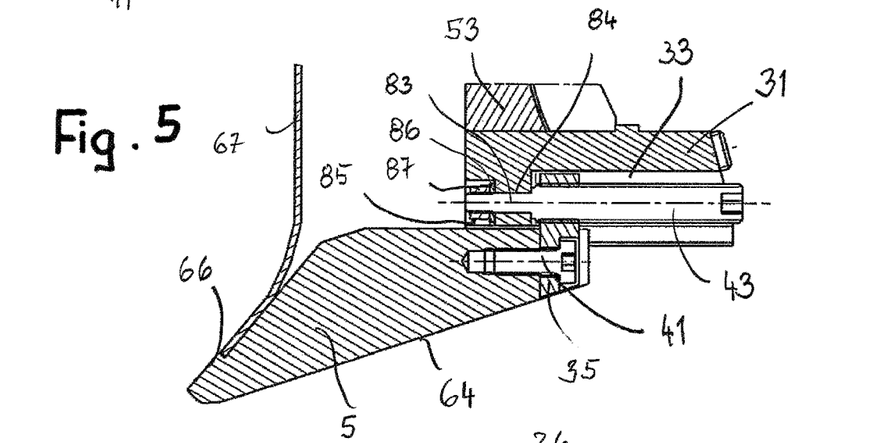
FIG. 5 in enlarged illustration and in section in analogy to FIG. 3 a pressing element with associated adjusting device.

A nut 34, 35 in the form of a flat material (block) is fastened with a screw 40, 41 on the pressing element 5 (FIGS. 2 and 5). The nut 35, 34 is penetrated by an adjusting spindle 42, 43, respectively, which extends in x direction and projects from the keyways 32, 33 of the receptacles 30, 31 (FIG. 5). The nuts 35, 34 each are seated with a threaded section on the adjusting spindles 42, 43 so that they can be adjusted in x direction by rotation of the adjusting spindles. In this way, the pressing elements 5 which are fixedly connected with the nuts 34, 35 can be adjusted continuously in x direction. The adjusting spindles 42, 43 are received and supported in the receptacles 30, 31 so as to be axially secured and rotatable. The adjusting spindles 42, 43 project with an end section 83, preferably of reduced diameter (FIG. 5), through a respective opening 84 of the receptacles 30, 31 into a respective depression 85 and the end section does not project past it. A disk 86 and a self-locking nut 87 are seated on the end section 83 within the depression 85. The adjusting spindle 42, 43 is rotatably supported in the openings 84 of the receptacles 30, 31, respectively. The disk 86 is resting on the bottom of the depression 85. With the described embodiment, the form-fit securing action of the pressing element 5 is effected so that it cannot be pushed into the tool 2.

Figure 3:
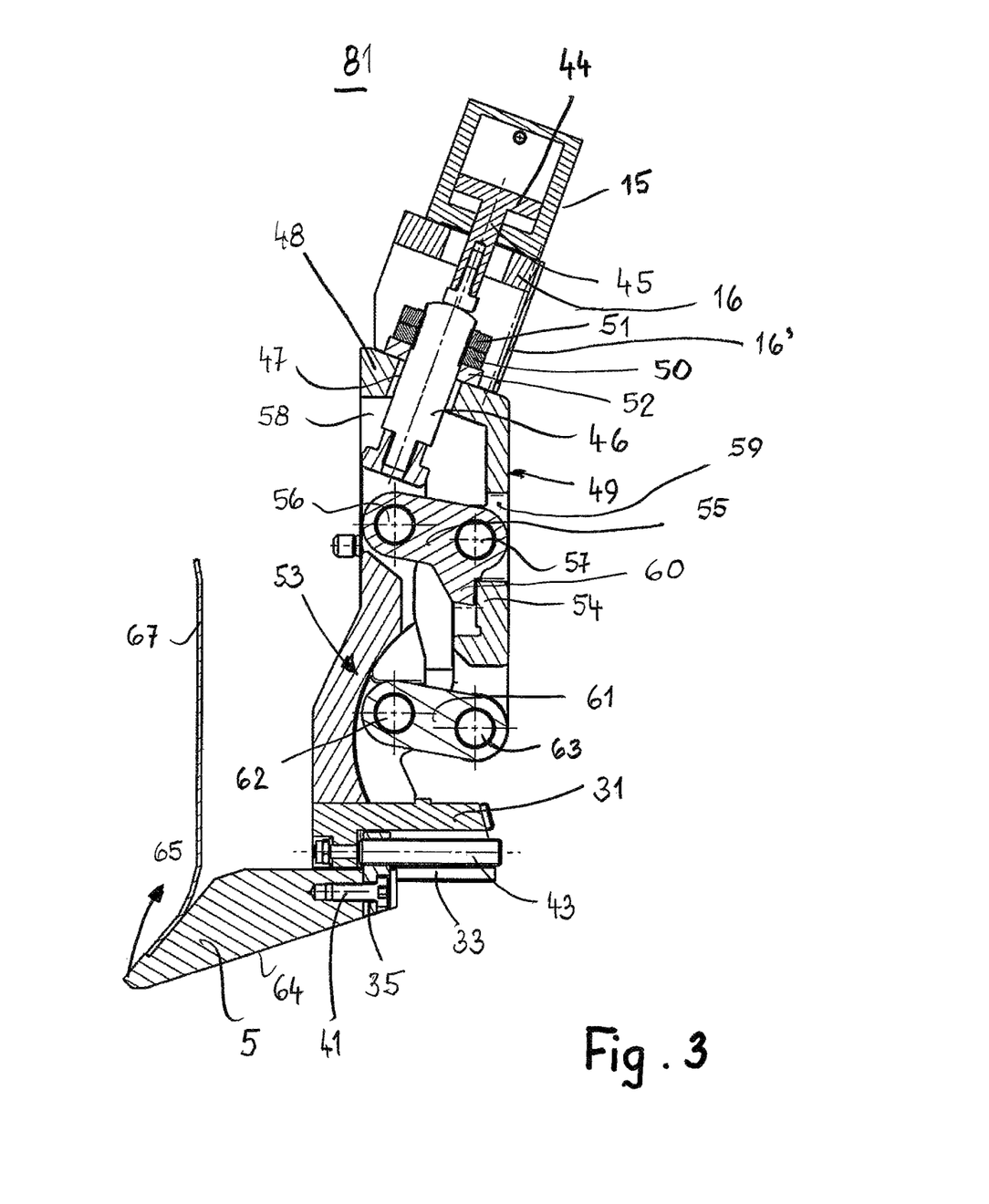
FIG. 3 in enlarged illustration a section along the line III-III in FIG. 2.

The pressing cylinders 14, 15 and their interaction with the pressing base 53 are identical. Therefore, this embodiment is described in the following only with the aid of the pressing cylinder 15. The pressing cylinder 15 has a piston 44 whose piston rod 45 is contacting the end face of a plunger 46 (FIG. 3). It projects with clearance through an opening 47 of a cover 48 of the pressing case 49.

A groove nut 50 is seated on the plunger 46 outside of the pressing case 49 and is screwed onto the end of the plunger 46 projecting out of the pressing case 49. The groove nut 50 is secured by a counter nut 51 which is also a groove nut and is also screwed onto the end of the plunger 46 that is projecting past the pressing case 49. The groove nut 50 is resting in the basic position on a damping disk 52 which is also seated on the plunger 46 and is contacting the exterior side of the cover 48 of the pressing case 49.

A sheet metal piece 16', which is fastened to the support 16 on which the two pressing cylinders 14, 15 are seated, covers in outward direction the area in which the plunger 46 extends past the cover 48 of the pressing case 49.

Within the pressing case 49, the plunger 46 is fixedly connected to the pressing base 53. At its bottom end, the receptacle 31 is attached. When the pressing cylinder 15 is not switched on, i.e, is pressureless, the pressing base 53 is resting with the pressing element 5 under the force of gravity on the workpiece 3. The pressing cylinder 15 provides by force action of its piston rod 45 on the plunger 46 an additional pressing force of the pressing element 5 on the workpiece 3 when it is pressure-loaded on the piston side (direction of extension of the piston rod). A pressure spring can be employed also instead of the pressing cylinder 15.

The movement path of the support elements 5 downward in y direction is limited by the plunger 46 with the damping disk 52. With the groove nut 50, the stroke of the plunger 46 and of the damping disk 52 can be adjusted. This stop position is realized in that the damping disk 52 contacts the cover 48 of the pressing case 49.

The movement path of the stop element 5 downward in y direction can be limited also by a stop 54 which is formed by a part of the pressing case 49. Adjacent to the bottom end of the plunger 46 the pressing base 53 is pivotably connected by means of a strap-shaped joint member 55 with the pressing case 49. The joint member 55 is connected with two parallel positioned bolts 56, 57, extending in z direction, to the pressing base 53 and the pressing case 49. The pressing base 53 and the pressing case 49 are each provided with a slot 58, 59 into which the joint member 55 is projecting.

A stop nose 60 is projecting away from the joint member 55 and, in the lower start position of the pressing elements 5, is resting on the stop 54 of the pressing case 49. The stop 54 is formed by the inner side of the pressing case 49 in the area of the slot 59.

When the movement travel of the stop elements 5 downward in y direction is reached by the stroke limitation of the plunger 46, the stop nose 60 is not yet contacting the stop 54.

The pressing base 53 is pivotably connected with a further joint member 61 to the pressing case 49. Similar to the joint member 55, the joint member 61 is of a strap-shaped configuration and is pivotably connected by two parallel extending bolts 62, 63 to the pressing base 53 and the pressing case 49. The two joint members 55, 61 are positioned at a spacing above each other and form parallel kinematics with which it is ensured that the pressing base 53 is pivoted reliably relative to the pressing case 49.

FIG. 3 shows the pressing element 5 in the start position in which the stroke limitation of the plunger 46 is acting. In this start position of the pressing element 5, the plunger 46 is resting by means of the groove nuts 50, 51 with intermediate position of the damping disk 52 under weight force and optionally cylinder force on the cover 48 of the pressing case 49 and forms in this way the stop for the pressing element 5 in its start position. As soon as the workpiece 3 to be machined is supplied in transport direction x, it is running against the slantedly positioned bottom side 64 of the pressing elements 5 and lifts them in this way. In this context, the pressing base 53 pivots by means of the joint members 55, 61 relative to the pressing case 49. The pressing elements 5 are positioned at least under weight force on the workpiece 3. By pressure loading of the piston 44 of the pressing cylinder 14, 15, an additional pressing force is exerted on the workpiece 3. When the pressing elements 5 are lifted by the workpiece 3, the plunger 46 is displaced upward against the cylinder force. As soon as the workpiece 3 has been moved past the pressing elements 5, the latter drop again downward under the weight force and optionally under the action of the cylinder force. In this context, the damping disk 52 prevents a hard and loud impact of the groove nut 50 on the cover 48 of the pressing case 49 or of the stop nose 60 on the stop 54. The pressing elements 5 therefore automatically are returned by their weight force in downward direction into the start position illustrated in FIG. 3.

The pressing base 53 and thus the pressing element 5, when lifted by the workpiece 3, carry out a pivot movement which is indicated in FIG. 3 by arrow 65. The two joint members 55, 61 pivot in this context about the axes of the bolts 57, 63. Also, the joint members 55, 61 pivot about the bolt 56, 62 relative to the pressing base 53. Due to the installation position of the joint members 55, 61 and the parallel kinematics, the pressing element 5 pivots away from the tool when the pressing element 5 is lifted by the workpiece, i.e., is pivoted upwardly.

On the slantedly positioned front side 66 of the pressing element 5 a chip deflector sheet 67 is attached (FIGS. 3 and 5) that extends from the pressing element 5 upwardly at a spacing to the pressing base 53. As can be seen in FIG. 1, the chip deflector sheet 67 effects that chips that are produced by the tool 2 are guided into the suction hood 12.

When the pressing device 81 comprises two or more pressing elements 5, then each pressing element advantageously comprises such a chip deflector sheet 67.

In the embodiment, the pressing device 81 comprises the described two adjacently positioned pressing elements 5. They are attached in the described way on a pressing base 53, respectively, and are loaded by a respective plunger 46 by means of the associated pressing cylinder 14, 15. The two pressing elements 5 can thus act independent of each other so that, for example, across the width of the workpiece 3 possibly existing non-uniform thicknesses can be compensated by different upward pivoting of the pressing elements 5.

By means of the adjusting spindles 42, 43, the pressing elements 5 can be continuously adjusted very finely relative to the receptacle 30, 31 in x direction. The adjusting spindles 42 enable a continuous adjustment of the pressing elements 5 relative to the cutting circle of the tool and not only in predetermined steps. The adjusting spindles 42, 43 can be reached easily from the input side of the pressing device so that the pressing elements 5 can be easily operated by the operator.

Figure 4:
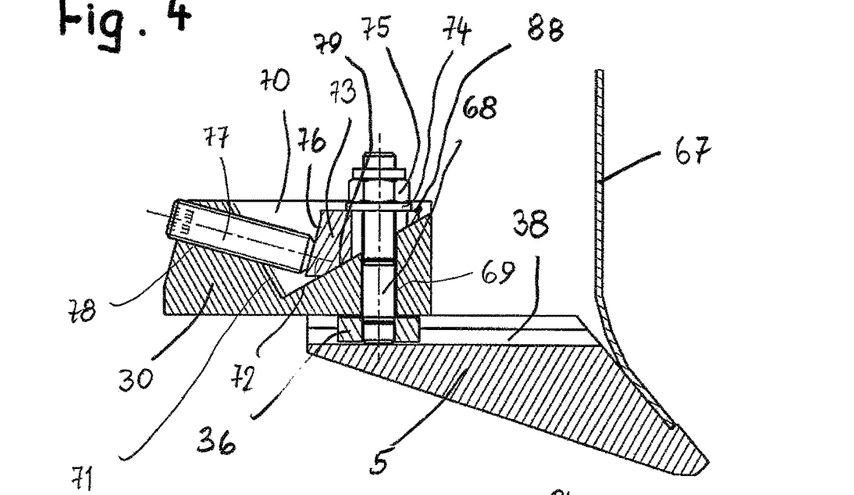
FIG. 4 in enlarged illustration a section along the line IV-IV of FIG. 2.

The clamping action of the pressing elements 5 on the receptacles 30, 31 is realized by a type of wedge drive that is explained with the aid of FIG. 4 in more detail.

The sliding block 36, 37 engaging the grooves 38, 39 is seated on the lower end of a stud bolt 68 which extends in y direction and extends through a vertical opening 69 in the receptacle 30. It is provided with a recess 70 on its side facing away from the pressing element 5 which is delimited by two walls 71, 72 positioned angularly relative to each other. In the embodiment, the two walls are positioned at a right angle to each other wherein the wall 71 is positioned at a steeper angle relative to a vertical plane than the wall 72. The opening 69 opens at the wall 72.

A wedge pressure member 73 is resting flat against the wall (counter wedge surface) 72 and is penetrated with clearance by stud bolt 68. With intermediate positioning of a washer 74, a nut 75 is screwed onto the end of the stud bolt 68 which is projecting past the wedge pressure member 73, and is secured in a suitable way on the stud bolt 68 against loss, preferably is a self-locking nut.

The wedge pressure member 73 has a face 76 which is facing the wall 71 and on which a threaded pin 77 is resting.

The axis of the threaded pin 77 is positioned perpendicular to the face 76. The threaded pin 77 is housed in a threaded bore 78 which opens at the wall 71. The threaded pin 77 projects advantageously from the receptacle 30 so that it can be easily actuated by the operator of the pressing device.

The wedge pressure member 73 is resting with a wedge surface 79 flat against the wall (counter wedge surface) 72 and with another wedge surface 88 against the washer 74. The wedge surfaces 79 and 88 are positioned at an acute angle relative to each other. In this way, a very high clamping effect is achieved when the wedge pressure member 73 by means of the threaded pin 77 is moved forwardly. In this context, one wedge surface 79 is supported against the wall (counter wedge surface) 72 and the second wedge surface 88 effects by means of the washer 74 and the nut 75 an upwardly oriented movement and loading of the stud bolt 68. In connection with the sliding block 36, the pressing element 5 is thus pulled tightly against the receptacle 30 and thus reliably clamped or tightened. The size of the clamping force is determined inter alia by the angle of the wedge surfaces 79 and 88. The clamping force is the greater the smaller this angle is. However, a certain minimum value must be observed because otherwise a self-locking action of the wedge member 73 will occur. In this case, clamping of the pressing element 5 would no longer be automatically released despite loosening of the threaded pin 77.

The threaded pin 77 is easily accessible from the input side of the pressing device by the operator so that clamping of the pressing element 5 on the receptacle 30, 31 is easily possible.

The pressing elements 5 are adjusted as described in x direction in an exactly horizontal plane. The vertical alignment is not changed thereby so that a readjustment in vertical direction after adjustment of the pressing element 5 in x direction is not required. In this way, a fast and simple adjustment of the pressing elements 5 is ensured.

By adjustment in the horizontal plane without affecting the vertical position, the special advantage results that the two adjacently positioned pressing elements 5 can have different positions in x direction. In case of machining by profiling or moulding, for different cutting circle diameters across the length of the tools, the two pressing elements 5 can be adjusted in an optimal way into close proximity of the respective cutting circle diameter.

With the adjusting device 8, the pressing case 49 is adjusted in y direction. The adjusting device 8 (FIG. 1) has a threaded spindle 89 on which at the upper end a crank 90 is seated with which the threaded spindle 89 can be rotated about its axis. The threaded spindle 89 with the crank 90 as well as a display device 91 are fastened on the suction hood 12. The threaded spindle 89 interacts with a thread which is part of the pressing case 49. When therefore the threaded spindle 89 is rotated about its axis, the pressing case 49 is adjusted in y direction when its clamping action is canceled by means of the clamping lever 11.

In place of the described pressing device 80 downstream of the top spindle, a pressing device in a constructively similar configuration as the pressing device 81 can be arranged also downstream of the top spindle. Also, such a pressing device 81 can be used not only for top spindles but also for other spindles, for example, in case of a universal spindle that can be used as a horizontal spindle as well as a vertical spindle as well as a slantedly positioned spindle.

What is claimed is:

1. A pressing device for a machine tool for processing or machining workpieces of wood and plastics, the pressing device comprising:

at least one support comprising a counter wedge surface;
at least one pressing element that is fastened to the at least one support and is configured to press the workpieces against a transport path of the machine tool supporting the workpieces as the workpieces pass through the machine tool so that the workpieces are guided along the transport path;
at least one wedge clamping device comprising at least one wedge pressure member, wherein the at least one wedge pressure member comprises a first wedge surface and the first wedge surface is resting on the counter wedge surface of the at least one support;
the at least one wedge clamping device further comprising at least one adjusting element acting on the at least one wedge pressure member in an actuation direction so as to move the at least one wedge pressure member relative to the counter wedge surface in a direction transverse to the actuation direction and
clamp the at least one pressing element on the at least one support.

2. The pressing device according to claim 1, wherein the at least one wedge pressure member is supported on the counter wedge surface of the at least one support.

3. The pressing device according to claim 1, further comprising a stud bolt penetrating an opening of the at least one wedge pressure member and arranged with a radial clearance relative to the opening.

4. The pressing device according to claim 3, further comprising a fastening element that is held on the stud bolt, wherein the at least one wedge pressure member applies a load to the fastening element when the at least one pressure member is moved by the at least one adjusting element.

5. The pressing device according to claim 4, wherein the at least one wedge pressure member comprises a second wedge surface, wherein the first wedge surface and the second wedge surface are positioned at an acute angle relative to each other, wherein the first wedge surface is contacting flat the counter wedge surface of the at least one support and wherein the second wedge surface is acting on the fastening element.

6. The pressing device according to claim 3, wherein the at least one pressing element comprises a groove, wherein the stud bolt is fixedly connected to a sliding block, and wherein the sliding block is positioned in the groove.

7. The pressing device according to claim 6, wherein the groove is a T groove.

8. The pressing device according to claim 1, wherein the at least one adjusting element engages a contact surface of the at least one wedge pressure member, wherein the contact surface is extending angularly relative to the first wedge surface.

9. The pressing device according to claim 1, wherein the at least one adjusting element is an adjusting pin which is screwed into a threaded bore of the at least one support.

10. The pressing device according to claim 1, wherein the at least one support comprises a recess with a bottom and wherein the counter wedge surface is the bottom of the recess.

11. The pressing device according to claim 1, further comprising at least one adjusting spindle operatively connected to the at least one pressing element, wherein the at least one adjusting spindle is configured to adjust the at least one pressing element relative to the at least one support in a horizontal plane.

12. The pressing device according to claim 1, wherein the pressing device is adjustable in a vertical direction.

13. The pressing device according to claim 12, further comprising at least one clamping lever, wherein the pressing device is clampable by the at least one clamping lever in a vertical clamping position in the vertical direction.

14. The pressing device according to claim 13, further comprising at least one axial thrust bearing, wherein, in the vertical clamping position, the at least one clamping lever is configured to clamp via the at least one axial thrust bearing the pressing device against a suction hood of the machine tool.

15. The pressing device according to claim 14, wherein the at least one axial thrust bearing surrounds a stud bolt, wherein the stud bolt comprises a first end configured to be fastened to the suction hood and further comprises a second end, wherein the at least one clamping lever is screwed onto the second end.

16. The pressing device according to claim 1, further comprising at least one pressing base and a pressing case, wherein the at least one pressing base is connected pivotably to the pressing case, wherein the at least one support is connected to the at least one pressing base.

17. The pressing device according to claim 16, further comprising at least one plunger, wherein the at least one pressing base comprises an end that is facing away from the at least one pressing element, wherein the end that is facing away from the at least one pressing element is connected to the at least one plunger.

18. The pressing device according to claim 17, wherein the at least one plunger comprises at least one stop, wherein, in a start position of the at least one pressing element, the at least one stop is resting on at least one damping element arranged on the pressing case, wherein the at least one stop forms a stop for the at least one pressing element in the start position.

19. The pressing device according to claim 1, wherein the at least one pressing element comprises a start position defined by a stop, wherein the at least one pressing element is configured to return into the start position by its own weight force.

20. A machine tool comprising at least one pressing device according to claim 1.

21. The machine tool according to claim 20, further comprising at least one horizontal spindle positioned in an area above a transport path for a workpiece to be transported in a transport direction through the machine tool, wherein a tool is fixedly seated on the at least one horizontal spindle.

22. The machine tool according to claim 20, wherein the at least one pressing element of the at least one pressing device is arranged upstream of the at least one horizontal spindle in the transport direction of the workpiece.

23. The machine tool according to claim 22, wherein the at least one pressing element is positioned in the transport path of the workpiece and is configured to be lifted by the workpiece as the workpiece passes through the machine tool.

* * * * *